(12) United States Patent
Roberts (10) Patent No.: US 7,586,220 B2
(45) Date of Patent: Sep. 8, 2009

(54) ELECTROMECHANICAL GENERATOR FOR CONVERTING MECHANICAL VIBRATIONAL ENERGY INTO ELECTRICAL ENERGY

(75) Inventor: Stephen Roberts, Winchester (GB)

(73) Assignee: Perpetuum Ltd., Southampton (GB)

( * ) Notice: Subject to any disclaimer, the term of this patent is extended or adjusted under 35 U.S.C. 154(b) by 133 days.

(21) Appl. No.: 11/932,578

(22) Filed: Oct. 31, 2007

(65) Prior Publication Data

US 2008/0265692 A1    Oct. 30, 2008

(30) Foreign Application Priority Data

Apr. 27, 2007    (GB)    ................ 0708217.5

(51) Int. Cl.
*H02K 35/02*    (2006.01)
(52) U.S. Cl. ............... 310/15; 310/21; 310/29; 290/1 R
(58) Field of Classification Search ................ 310/15, 310/17, 22–24, 28–30, 36, 38; 290/1 R; 367/185, 187
See application file for complete search history.

(56) References Cited

U.S. PATENT DOCUMENTS

| | | | | |
|---|---|---|---|---|
| 3,582,874 A | * | 6/1971 | Fedoseenko | 367/185 |
| 3,610,973 A | * | 10/1971 | Bauer et al. | 310/15 |
| 4,412,317 A | * | 10/1983 | Asjes et al. | 367/185 |
| 5,528,697 A | * | 6/1996 | Saito | 381/396 |
| 5,554,922 A | * | 9/1996 | Kunkel | 322/3 |
| 7,023,112 B2 | * | 4/2006 | Miyamoto et al. | 310/12 |
| 2003/0034705 A1 | * | 2/2003 | Hakansson | 310/81 |
| 2003/0173725 A1 | | 9/2003 | Noe | |
| 2006/0091733 A1 | | 5/2006 | Binnard et al. | |
| 2007/0164616 A1 | * | 7/2007 | Kuwabara et al. | 310/15 |

FOREIGN PATENT DOCUMENTS

| | | | |
|---|---|---|---|
| CN | 1852011 A | | 10/2006 |
| DE | 4000592 A1 | | 7/1991 |
| DE | 10311567 | * | 11/2004 |
| DE | 102004054749 A1 | | 6/2006 |
| JP | 11032470 A | | 2/1999 |
| WO | 0233811 A1 | | 4/2002 |
| WO | 2005089284 A2 | | 9/2005 |

* cited by examiner

*Primary Examiner*—Burton Mullins
(74) *Attorney, Agent, or Firm*—Colin P. Cahoon; Carstens & Cahoon, LLP (57) ABSTRACT

An electromechanical generator for converting mechanical vibrational energy into electrical energy, the electromechanical generator comprising a housing, an electrically conductive coil assembly fixedly mounted in the housing, the coil assembly having radially inner and outer sides, and upper and lower edges, thereof, a mount for the coil assembly extending inwardly of the radially inner side for fixing the coil assembly in a fixed position in the housing, a magnetic core assembly movably mounted in the housing for linear vibrational motion along an axis, and a biasing device mounted between the housing and the magnetic core assembly to bias the magnetic core assembly in opposed directions along the axis towards a central position, wherein the magnetic core assembly encloses the electrically conductive coil assembly on the radially outer side and on the upper and lower edges, and on a part of the radially inner side, the magnetic core assembly having a gap on a radially inner portion thereof through which the mount extends, and the radially inner portion including two opposed magnets spaced along the axis.

25 Claims, 4 Drawing Sheets

ELECTROMECHANICAL GENERATOR FOR CONVERTING MECHANICAL VIBRATIONAL ENERGY INTO ELECTRICAL ENERGY

BACKGROUND TO THE INVENTION

The present invention relates to an electromechanical generator for converting mechanical vibrational energy into electrical energy. In particular, the present invention relates to such a device which is a miniature generator capable of converting ambient vibration energy into electrical energy for use, for example, in powering intelligent sensor systems. Such a system can be used in many areas where there is an economical or operational advantage in the elimination of power cables or batteries.

DESCRIPTION OF THE PRIOR ART

It is known to use an electromechanical generator for harvesting useful electrical power from ambient vibrations, e.g. for powering wireless sensors. A typical magnet-coil generator consists of a spring-mass combination attached to a magnet or coil in such a manner that when the system vibrates, a coil cuts through the flux formed by a magnetic core.

It is generally known in the art that as a rule the greater the mass of the spring-mass combination of the magnetic core generator, the greater the output electrical power. An energy harvester needs to produce high power over a wide bandwidth because the vibration frequency is not known before deployment, or could change. High power over a wide bandwidth for a resonant vibration energy harvester requires a high mass, a high Q and a high magnetic coupling factor.

US-A-2003/0173725 discloses a vibration damping device that converts mechanical energy into electrical energy and is mounted as a beater in a known manner in an aircraft, in particular a helicopter. Such a device is not designed for use as an electromechanical generator for efficiently harvesting a high amount of electrical power from ambient vibrations, e.g. for powering wireless sensors.

CN-A-1852011 discloses a magnetic-field extrusion reinforced vibration generator in which two opposed magnets are connected by a non-magnetic material slice therebetween to form an assembly that is biased by opposing springs for vibrational up/down movement in a housing. A coil annularly surrounds the slice, and is mounted in the housing on the inner wall thereof. Up and down vibrational movement of the assembly induces an electrical current in the surrounding coil.

SUMMARY OF THE INVENTION

The present invention aims to provide a device that maximizes all three of these parameters in a practical manner.

The present invention accordingly provides an electromechanical generator for converting mechanical vibrational energy into electrical energy, the electromechanical generator comprising a housing, an electrically conductive coil assembly fixedly mounted in the housing, the coil assembly having radially inner and outer sides, and upper and lower edges, thereof, a mount for the coil assembly extending inwardly of the radially inner side for fixing the coil assembly in a fixed position in the housing, a magnetic core assembly movably mounted in the housing for linear vibrational motion along an axis, and a biasing device mounted between the housing and the magnetic core assembly to bias the magnetic core assembly in opposed directions along the axis towards a central position, wherein the magnetic core assembly encloses the electrically conductive coil assembly on the radially outer side and on the upper and lower edges, and on a part of the radially inner side, the magnetic core assembly having a gap on a radially inner portion thereof through which the mount extends, and the radially inner portion including two opposed magnets spaced along the axis.

Preferably, the biasing device comprises a pair of springs, each being located at a respective end of the magnetic core assembly.

Preferably, the springs comprise plate springs.

Preferably, the magnetic core assembly comprises two opposed magnetic circuits spaced along the axis.

Preferably, the magnetic core assembly comprises a pair of magnets spaced along the axis, poles of the magnets having a first common polarity facing towards each other, and poles of the magnets facing away from each other being of a second common polarity and being coupled to a common ferromagnetic body located radially outwardly of the magnets relative to the axis.

Preferably, the common ferromagnetic body is tubular and has radially inwardly extending arms at each end thereof, each arm mounting a respective magnet thereon.

Preferably, the common ferromagnetic body comprises radially outer and upper and lower portions of the magnetic core assembly and the magnets comprise the radially inner portion.

Preferably, the mount for the coil assembly comprises an annular coil support which has a central mounting portion that extends radially inwardly from a central part of the coil assembly and is mounted on a central body that is fixed along the axis.

Preferably, the mounting portion defines an annular recess in which is received circuitry for electrically conditioning the electrical output of the coil assembly.

Preferably, the circuitry is encapsulated within the annular recess by a sealing material, which seals and protects the circuitry against undesired environmental influences.

Preferably, the mount for the coil assembly comprises a moulded plastic body that encapsulates the coil, the moulded plastic body including an integral central body that is fixed along the axis and is fitted to a lid and a base of the housing.

Preferably, the integral central body encapsulates an elongate stiffening member extending along the axis.

Preferably, the moulded plastic body encapsulates circuitry for electrically conditioning the electrical output of the coil assembly.

Preferably, the moulded plastic body encapsulates electrical wires extending from the coil assembly and further comprising connecting pins connected to the wires for electrical connection to an external electrical circuit, the connecting pins extending from an external surface of the moulded plastic body that is exposed at an exterior of the housing.

The present invention also provides an electromechanical generator for converting mechanical vibrational energy into electrical energy, the electromechanical generator comprising a fixed electrically conductive coil assembly and a magnet assembly movably mounted for linear vibrational motion along an axis, wherein the magnet assembly comprises a pair of magnets spaced along the axis, poles of the magnets having a first common polarity facing towards each other and separated by a gap, and poles of the magnets facing away from each other being of a second common polarity and being coupled to a common ferromagnetic body located radially outwardly of the magnets relative to the axis, and a biasing device for biasing the magnet assembly, comprising the pair of magnets and the ferromagnetic body coupled thereto, in opposed directions along the axis towards a central position, wherein the magnet assembly comprises two opposed magnetic circuits spaced along the axis, each magnetic circuit being associated with a respective portion of the coil assembly.

Preferably, the electromechanical generator further comprises a housing, wherein the electrically conductive coil assembly is fixedly mounted in the housing, the coil assembly having radially inner and outer sides, and upper and lower edges, thereof, a mount for the coil assembly extends inwardly of the radially inner side for fixing the coil assembly in a fixed position in the housing, the magnet assembly being movably mounted in the housing, and the biasing device is mounted between the housing and the magnet assembly, wherein the magnet assembly encloses the electrically conductive coil assembly on the radially outer side and on the upper and lower edges, and on a part of the radially inner side, the magnet assembly having the gap on a radially inner portion thereof through which the mount extends, and the radially inner portion including two opposed magnets spaced along the axis.

The biasing device preferably comprises a pair of springs, each being located at a respective end of the magnet assembly.

The springs may comprise plate springs.

Preferably, the magnet assembly is rotationally symmetric and has a substantially C-shaped cross-section defining the gap.

Preferably, the common ferromagnetic body is tubular and has radially inwardly extending arms at each end thereof, each arm mounting a respective magnet thereon.

Preferably, the common ferromagnetic body comprises radially outer and upper and lower portions of the magnet assembly and the magnets comprise a radially inner portion of the magnet assembly.

The present invention further provides an electromechanical generator for converting mechanical vibrational energy into electrical energy, the electromechanical generator comprising a fixed electrically conductive coil assembly and a magnet assembly movably mounted for linear vibrational motion along an axis, and a biasing device for biasing the magnet assembly in opposed directions along the axis towards a central position, wherein the magnet assembly is rotationally symmetric and has a substantially C-shaped cross-section enclosing an annular cavity, having a gap on the inner radius thereof, in which cavity the coil assembly is disposed.

Preferably, the magnet assembly comprises two opposed magnetic circuits spaced along the axis, each magnetic circuit being associated with a respective portion of the coil assembly.

Preferably, the electromechanical generator further comprises a housing, wherein the electrically conductive coil assembly is fixedly mounted in the housing, the coil assembly having radially inner and outer sides, and upper and lower edges, thereof, a mount for the coil assembly extends inwardly of the radially inner side for fixing the coil assembly in a fixed position in the housing, the magnet assembly being movably mounted in the housing, and the biasing device is mounted between the housing and the magnet assembly, wherein the magnet assembly encloses the electrically conductive coil assembly on the radially outer side and on the upper and lower edges, and on a part of the radially inner side, the magnet assembly having a gap on a radially inner portion thereof through which the mount extends, and the radially inner portion including two opposed magnets spaced along the axis.

Preferably, the biasing device comprises a pair of springs, each being located at a respective end of the magnet assembly.

In the electromechanical generator of the preferred embodiment of the present invention a high moving mass can be achieved by filling almost all of the internal space with a metallic magnetic core assembly. This can be achieved at least partly because flat springs at opposed ends of the magnetic core assembly are volume efficient. In addition, a high Q comes from the fact that the "enclosed" structure of the magnetic core assembly leaks very little flux, and so there is very little eddy current in the surrounding material of the stationary housing. Accordingly, little clearance needs to be kept between the moving magnetic core assembly and the housing, allowing more moving mass. A high magnetic coupling comes also from the enclosed nature of the magnetic core assembly where very little flux leaks out—almost all the magnetic flux gets channeled though the coil.

BRIEF DESCRIPTION OF THE DRAWINGS

Embodiments of the present invention will now be described by way of example only with reference to the accompanying drawings, in which.

DETAILED DESCRIPTION OF THE PREFERRED EMBODIMENTS

The electromechanical generator of the present invention is a resonant generator known in the art as "velocity-damped" where all of the work done by the movement of the inertial mass relative to the housing is proportional to the instantaneous velocity of that movement. Inevitably, a portion of that work is absorbed overcoming unwanted mechanical or electrical losses, but the remainder of the work may be used to generate an electrical current via a suitable transduction mechanism, such as the electrical coil/magnetic assembly described below.

Figure 1:
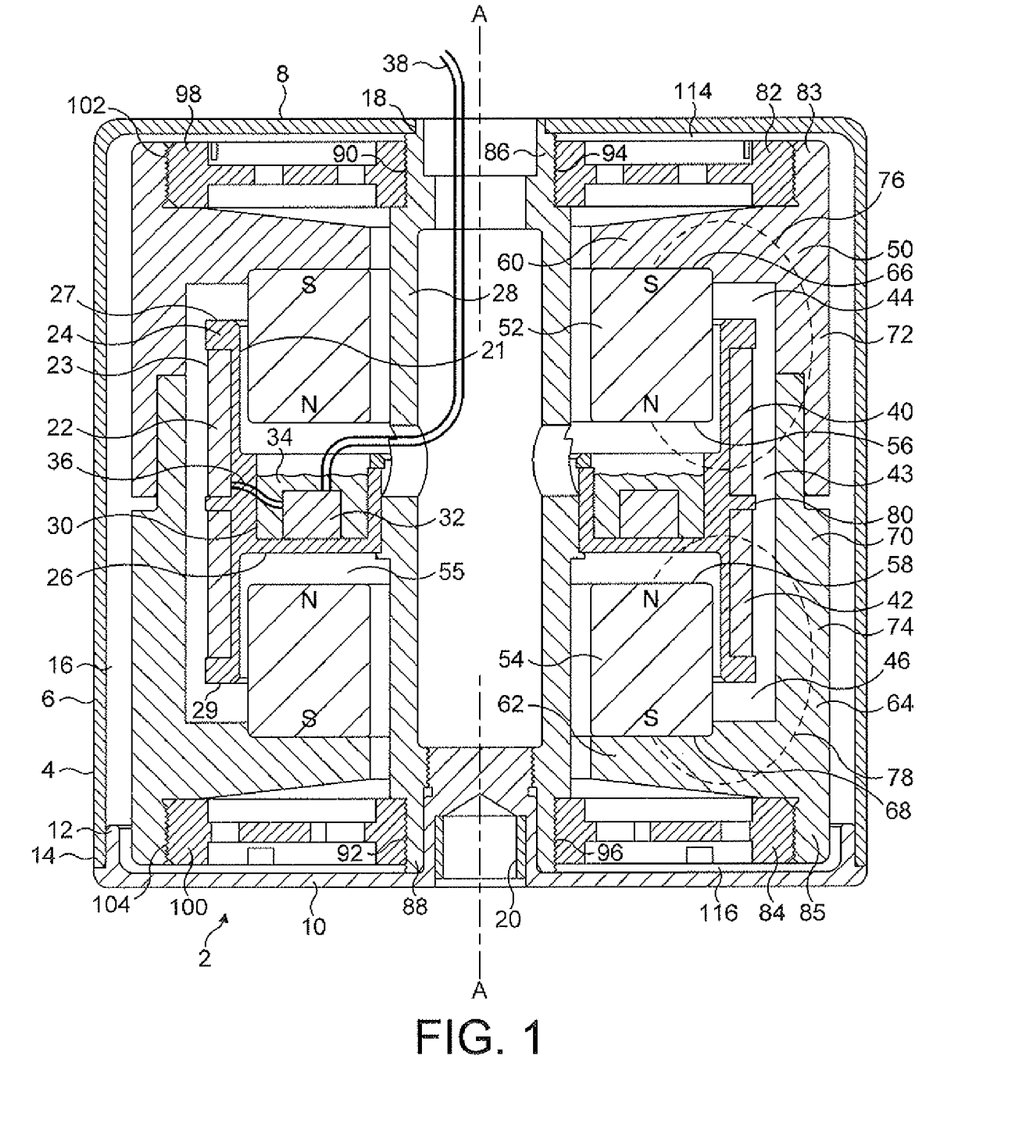
FIG. 1 is a schematic side section through an electromechanical generator for converting mechanical vibrational energy into electrical energy in accordance with a first embodiment of the present invention.
Figure 2:
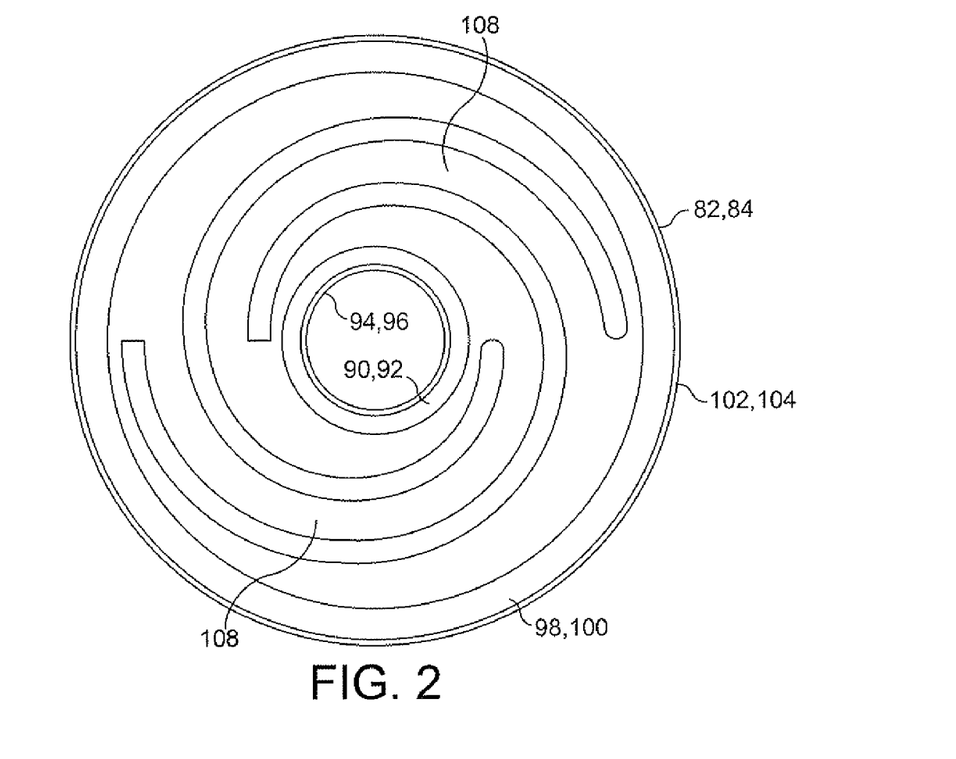
FIG. 2 is a schematic plan view of a first spring in the electromechanical generator of FIG. 1.
Figure 3:
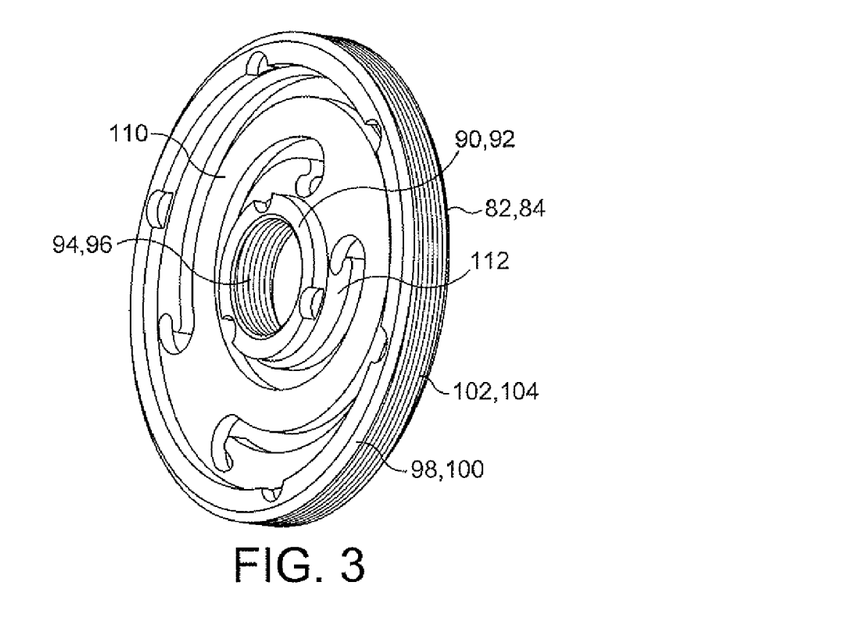
FIG. 3 is a schematic perspective view of a second spring in the electromechanical generator of FIG. 1.

FIGS. 1 to 3 show an electromechanical generator 2 for converting mechanical vibrational energy into electrical energy in accordance with a first embodiment of the present invention. 1. The electromechanical generator 2 comprises a housing 4. The housing 4 comprises an annular outer peripheral wall 6, an integral circular lid 8 and a circular base 10. The base 10 is securely fitted at its circular edge 12 to a lower edge 14 of the outer peripheral wall 6, for example by means of adhesive or a threaded coupling (not shown). The outer peripheral wall 6 defines a cylindrical cross-section interior volume 16, having an axis of rotation A-A. A circular opening 18 is formed through the lid 8, which opening 18 is coaxial with the cylindrical cross-section interior volume 16. The base 10 is provided with a fitting 20 in its outer surface for securely mounting the electromechanical generator 2 to a support (not shown).

An electrically conductive coil 22 is fixedly mounted in the housing 4. The coil 22 is circular and is coaxial with the housing 4, and has radially inner and outer sides 21, 23, the sides 21, 23 extending parallel to the axis of rotation A-A. The coil 22 has upper and lower edges 27, 29. The coil 22 is mounted within an annular coil support 24 which is located substantially midway in a radial direction between the axis A-A and the outer peripheral wall 6, and also substantially midway in an axial direction between the lid 8 and the base 10. The coil support 24 has an integral annular central mounting portion 26 that extends radially inwardly from a central part of the coil 22 and is mounted on a central tubular body 28 that is securely fitted between the lid 8 and the base 10. This assembly mounts the coil 22 in a fixed position within the housing 4. Preferably the coil support 24 is made from a very low-conductivity material, such as glass-loaded plastic. Preferably the central tubular body 28 is made from a low-permeability, low-conductivity, but high-elastic-modulus material such as 316 stainless steel.

The mounting portion 26 defines an annular recess 30 in which is received circuitry 32 for electrically conditioning the electrical output of the coil 20, for example by voltage regulation. The circuitry 32 is encapsulated within the annular recess 30 by a plastic or rubber sealing material 34, which seals and protects the circuitry 32 against undesired environmental influences, such as humidity, liquids, etc. The coil 22 is connected the circuitry 32 by first wires 36 and in turn the circuitry 32 has second wires 38 extending therefrom through the opening 18 in the lid 8 for connecting to external circuitry (not shown).

The coil 20 has first and second coil portions 40, 42 thereof respectively located above and below the mounting portion 26.

A magnetic core assembly 50 is movably mounted in the housing 4 for linear vibrational motion along the axis A-A. The magnetic core assembly 50 is rotationally symmetric and includes a pair of axially aligned annular magnets 52, 54, each typically a rare earth permanent magnet having a high magnetic field strength The magnets 52, 54 are mounted on opposite sides, above and below, of the mounting portion 26 and radially inwardly of the coil 20. The magnets 52, 54 are each axially spaced from the mounting portion 26, and define a gap 55 through which the mounting portion 26 extends. As shown in FIG. 1, the magnets 52, 54 are aligned so that their identical poles 56, 58 (e.g. the north (N) poles as shown in FIG. 1) face each other on opposite sides of the mounting portion 26.

The magnetic core assembly 50 also includes a common ferromagnetic body 64. The magnets 52, 54 are mounted between opposed annular arms 60, 62 of the common ferromagnetic body 64. The poles 66, 68 (e.g. the south (S) poles) of the magnets 52, 54 that face away from each other in an axially outward direction are each mounted on a respective annular arm 60, 62. The common ferromagnetic body 64 also includes a tubular portion 70 comprised of two mutually interlocking tubular members 72, 74, each integral with a respective annular arm 60, 62. In this way, each of the first and second coil portions 40, 42 is respectively at least partly located between tubular portion 70 of the common ferromagnetic body 64 and one of the magnets 52, 54.

This magnetic core assembly 50 of the radially outer common ferromagnetic body 64 coupled to the radially inner magnets 52, 54 defines therebetween an annular enclosed cavity 43 in which the coil 22 is received. The magnets 52, 54 are in the vicinity of the inner side 21 of the coil 22 and the common ferromagnetic body 64 is in the vicinity the outer side 23 of the coil 22. The magnets 52, 54 and the common ferromagnetic body 64 are slightly spaced from the coils 22 to permit relative translational movement therebetween. The magnetic core assembly 50 encloses the coil 22 on the radially outer side 23 and on the upper and lower edges 27, 29, and on a part of the radially inner side 21, the magnetic core assembly having the gap 55 on a radially inner portion thereof, comprised of the magnets 52, 54, through which the mounting portion 26 extends. The common ferromagnetic body 64 comprises the radially outer and upper and lower portions of the magnetic core assembly 50. The magnetic core assembly 50 therefore has a substantially C-shaped cross-section and is rotationally symmetric.

The cavity 43 has respective cavity portions 44, 46 between each of the first and second coil portions 40, 42 and the central tubular body 28, and above or below, respectively, the mounting portion 26

The common ferromagnetic body 64 is composed of a ferromagnetic material having a high magnetic permeability, and a high mass, such as soft iron. The assembly of the common ferromagnetic body 64 and the magnets 52, 54 therefore forms two axially spaced magnetic circuits 76, 78 of the magnetic core assembly 50, the magnetic flux being shown by the dashed lines in FIG. 1, one for each magnet 52, 54. The limits of the lines of magnetic flux each magnetic circuit 76, 78 are defined by the respective annular arm 60, 62 and tubular member 72, 74, which substantially prevents magnetic flux from each magnet 52, 54 extending axially or radially outwardly from the common ferromagnetic body 64. Since the opposed magnets 52, 54 face each other with common poles 56, 58 (e.g. N poles), at the central region 80 of the magnetic core assembly 50 the magnetic flux of the opposed magnetic circuits 76, 78 are in opposition thereby directing the magnetic flux radially outwardly towards the common ferromagnetic body 64.

The resultant effect is that a single magnetic core assembly 50 comprises two separate magnets 52, 54 and each has a respective magnetic circuit 76, 78 in which a very high proportion of the magnetic flux is constrained to pass through the respective coil portion 40, 42. This in turn provides a very high degree of magnetic coupling between the magnets 52, 54 and the coil 22. Consequently, any relative movement between the magnets 52, 54 and the coil 22, in particular as described below by linear axial resonant movement of the magnetic core assembly 50 relative to the fixed coil 22, produces a very high electrical power output at the coil 22.

The common ferromagnetic body 64 is movably mounted to the central tubular body 28 by a pair of opposed plate springs 82, 84. One spring 82, 84 is located between each respective upper or lower end 83, 85 of the common ferromagnetic body 64 and a respective upper or lower end 86, 88 of the central tubular body 28. A radially inner annular edge 90, 92 of each spring 82, 84 is securely fitted, e.g. by a screw thread 94, 96, to the respective upper or lower end 86, 88. A radially outer annular edge 98, 100 of each spring 82, 84 is securely fitted, e.g. by a screw thread 102, 104 to the respective upper or lower end 83, 85 of the common ferromagnetic body 64.

As shown in FIG. 2, in one alternative arrangement each spring 82, 84 has a spiral configuration, with plural spiral arms 108 extending between the radially inner annular edge 90, 92 and the radially outer annular edge 98, 100.

As shown in FIG. 3, in another alternative arrangement each spring 82, 84 has a stepped yoke configuration, with plural eccentric yokes 110, 112 extending in a cascading stepwise manner between the radially inner annular edge 90, 92 and the radially outer annular edge 98, 100.

The two springs 82, 84 each apply the same mechanical biasing force against the magnet assembly 50 when the magnetic core assembly 50 is moved away from a central equilibrium position. The two springs 82, 84 preferably have the same spring constant.

The provision of a pair of plate springs 82, 84 at opposed axial ends of the movable magnetic core assembly 50 provides a structure that can not only provide a sufficient spring biased restoring force on the magnetic core assembly 50 to bias it towards an axially central position with respect to the coil 22 but also takes up substantially minimum volume within the housing 4. In particular, the location of the springs 82, 84 at opposed axial ends of the movable magnetic core assembly 50 enables the magnetic core assembly 50 to extend radially outwardly substantially as far as the interior radial limits of the housing 4. This maximizes the size of the magnetic core assembly 50 for a given interior volume 16, which not only maximizes the magnetic coupling, but also importantly permits the mass of the movable magnetic core assembly to be correspondingly maximized. As known in the art, there is a desire to maximize the mass of the movable magnetic core assembly in a resonant vibrational electromagnetic energy harvester because this increases the output electrical power.

The provision of a pair of plate springs 82, 84 also avoids the need for expensive and cumbersome helical springs surrounding the movable magnetic core assembly. This decreases the manufacturing cost by reducing the component cost.

The high degree of magnetic coupling between the movable magnetic core assembly and the coil, and the high mass of the movable magnetic core assembly, enables the resonant frequency readily to be tuned accurately to a desired value, and also permits a high self-restoring force to be applied to the movable magnetic core assembly during its resonant oscillation to minimize the amplitude of the oscillation. Since the amplitude is limited, the springs 82, 84 are only ever deformed by a very small degree, well within their linear spring characteristics. Typically, the annular gap 114, 116 between annular fitting 102, 104 and the lid 8 or base 10 respectively is about 1 mm, and the maximum amplitude is accordingly less than this distance. Again, this maximizes the useful volume 16 of the housing 4 in an axial direction.

The springs 82, 84 bias, back towards the central position, the magnetic core assembly 50 which can move axially along the axis A-A when the electromechanical generator 2 is subjected to an applied mechanical force, in particular a mechanical vibration, having at least a component along the axis A-A. The springs 82, 84 have a high stiffness in the lateral, i.e. radial, direction so as substantially to prevent non-axial movement of the magnetic core assembly 50.

The interior volume 16 of the housing 4 may include a gas. The housing 4 may hermetically seal the interior volume 16 of the housing 4.

The electromechanical generator 2 uses a resonant mass-spring arrangement mounted within the housing 4. If the electromechanical generator 2 is subject to a source of external vibration that causes it to move along the direction A-A, then the magnetic core assembly 50 comprises an inertial mass which may move relative to the housing 4, also along the direction A-A. In doing so, the springs 82, 84 are deformed axially, and work is done against a damper comprising the static electrical coil and the movable magnetic core assembly that generates a region of magnetic flux within which the electrical coil is disposed. Movement of the electrical coil within the magnetic flux causes an electrical current to be induced in the electrical coil which can be used as a source of electrical power for driving an external device (not shown).

Also, although in this embodiment the springs are plate springs, other biasing elements may be employed.

The mass of the magnetic core assembly can be made to be very high relative to the size of the device, thereby to increase the overall mass density of the device as compared, for example, to a cantilever device. For a given volume to be occupied by the device, a greater moving mass can be provided. This also maximizes the electrical power output, for the reasons stated above.

By increasing the electrical output, as a result of increased magnetic coupling, the operating band width of the device can be greatly increased. This in turn greatly enhances the ability of the device to be used in many new energy harvesting applications.

Simple plate springs can be employed in the electromechanical generator. This provides a reliable and simple structure to prevent lateral movement on the magnetic core assembly, with low friction and avoiding complicated, intricate and/or expensive manufacturing techniques. The resultant structure is robust and compact. Since the plate springs are subjected to a very low amplitude of deformation, their mechanical properties are not especially critical, because they are never deformed anywhere near their mechanical limits of linear elastic movement, and so they can accordingly be of relatively conventional quality, and consequently have a low component cost.

Figure 4:
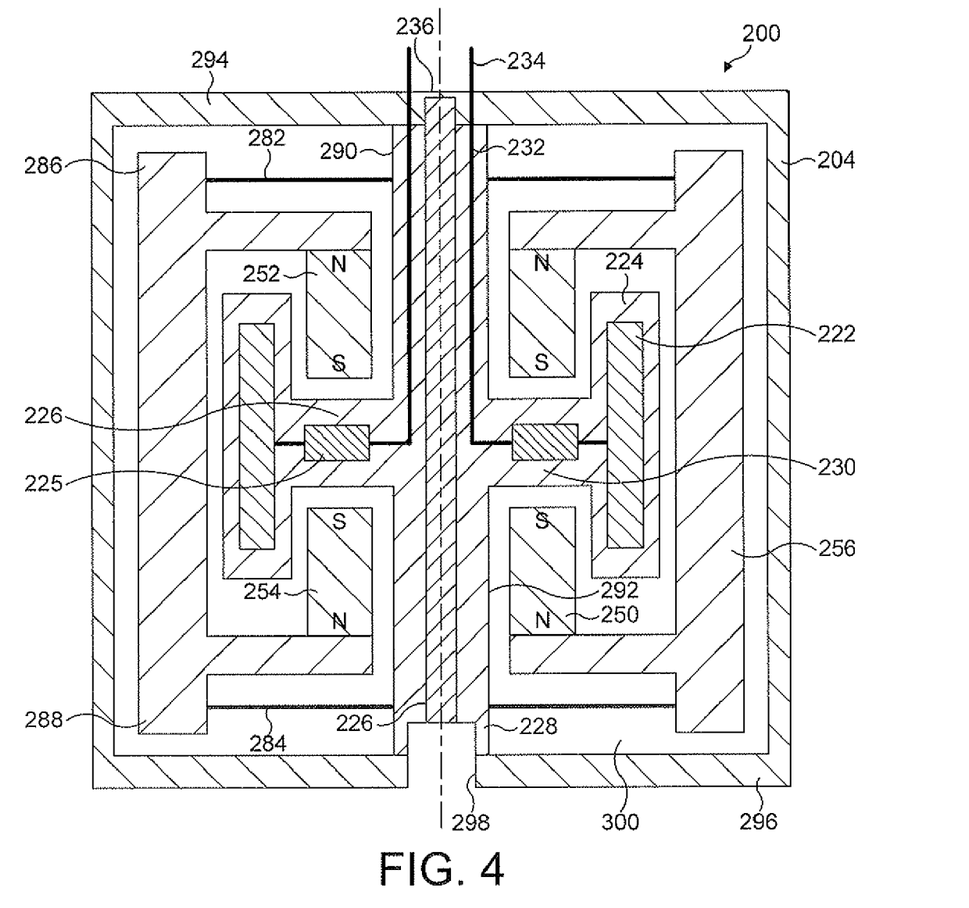
FIG. 4 is a schematic side section through an electromechanical generator for converting mechanical vibrational energy into electrical energy in accordance with a second embodiment of the present invention; and, FIGS. 5 and 6 are schematic side sections through the electromechanical generator of FIG. 4 showing the lower and upper positions, respectively, of the vibrating magnetic core assembly.

FIG. 4 shows a second embodiment which has a lower component cost than that of the first embodiment and is particularly suitable for use in energy harvesting applications in which the input mechanical vibrational energy has a low-frequency and has a high amplitude.

In this embodiment, the outer housing 204 of the electromagnetic generator 200 is composed of a moulded plastic material. The coil support 224, the central mounting portion 226 and the central tubular body 228 are formed of a single integral plastic moulded body 230 that encapsulates the coil 222, the coil 222 preferably being made of copper wire. A circuit board 225, optionally present, may also be encapsulated within the body 230. A metallic stiffening member 226 may optionally be moulded within the single integral plastic moulded body 230. The coil 222 has wires 232 leading therefrom that connect, via the optional circuit board 225, to connecting pins 234 set into the top surface 236 of the housing 204 for electrical connection to an external electrical circuit. The magnetic core assembly 250 comprises two annular magnets 252, 254, with opposed polarity, interconnected by a high permeability metallic core 256, for example of mild steel. The upper and lower springs 282, 284 are respectively mounted between upper and lower parts 286, 288 of the core 256 and upper and lower parts 290, 292 of the body 230, the upper and lower parts 290, 292 of the body 230 being securely fixed to the lid 294 and the base 296 respectively. This fixing may hermetically seal the interior volume 300 of the housing 204. The springs 282, 284 may comprise metal sheets shaped by chemical etching, for example to have the spiral plate spring construction shown in FIG. 2 or 3. A threaded hole 298 in the base 296 provided a screw fitting for screwing the electromagnetic generator 200 to a vibrating surface (not shown).

Figure 5:
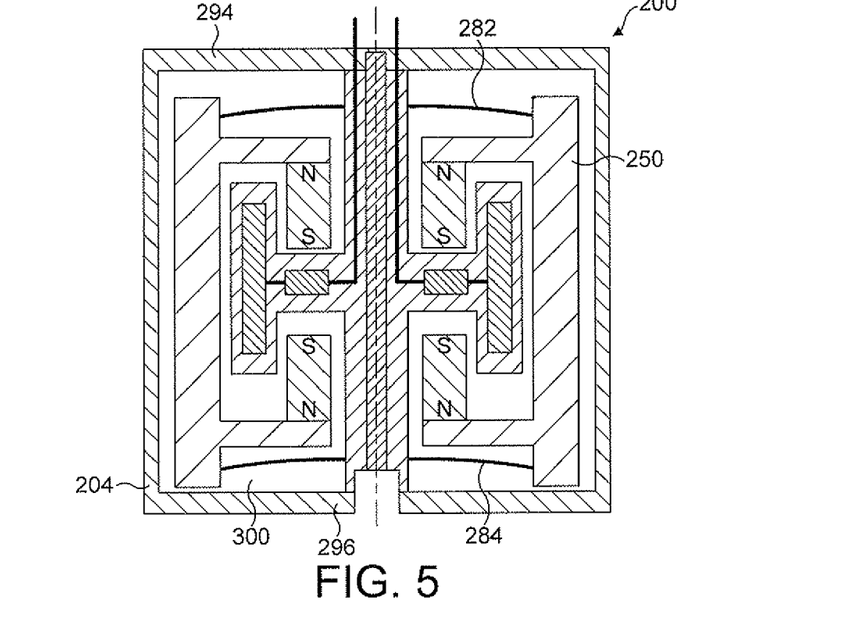
Figure 6:
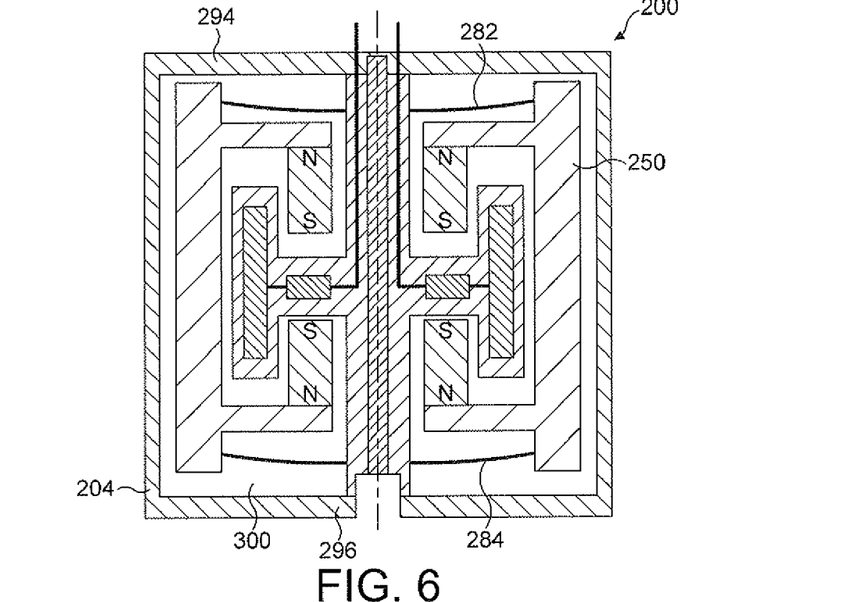

FIGS. 5 and 6 are schematic side sections through the electromechanical generator of FIG. 4 showing the lower and upper positions, respectively, of the vibrating magnetic core assembly. The upper and lower springs 282, 284 bias the magnetic core assembly 250 to the central position shown in FIG. 4, but when the electromagnetic generator 200 is subjected to a vibrational input the magnetic core assembly 250 vibrates about the central position and between the limits of the lower and upper positions shown in FIGS. 5 and 6. It may be seen that the upper and lower springs 282,284 control the movement of the vibrating magnetic core assembly 250 so that substantially the entire interior volume 300 of the housing 204 is employed to accommodate the moving element to generate electrical power, thereby rendering the device efficient in power to size ratio. At its upper and lower limits, the vibrating magnetic core assembly 250 typically is spaced about 1 mm from the lid 294 and base 296 of the housing 204.

Other modifications and embodiments of the present invention will be apparent to those skilled in the art.

What is claimed is:

1. An electromechanical generator for converting mechanical vibrational energy into electrical energy, the electromechanical generator comprising a housing, an electrically conductive coil assembly fixedly mounted in the housing, the coil assembly having radially inner and outer sides, and upper and lower edges, thereof, a mount for the coil assembly extending inwardly of the radially inner side for fixing the coil assembly in a fixed position in the housing, a magnetic core assembly movably mounted in the housing for linear vibrational motion along an axis, and a biasing device mounted between the housing and the magnetic core assembly to bias the magnetic core assembly in opposed directions along the axis towards a central position, wherein the magnetic core assembly encloses the electrically conductive coil assembly on the radially outer side and on the upper and lower edges, and on a part of the radially inner side, the magnetic core assembly having a gap on a radially inner portion thereof through which the mount extends, and the radially inner portion including two opposed magnets spaced along the axis.

2. An electromechanical generator according to claim 1 wherein the biasing device comprises a pair of springs, each being located at a respective end of the magnetic core assembly.

3. An electromechanical generator according to claim 2 wherein the springs comprise plate springs.

4. An electromechanical generator according to claim 1 wherein the magnetic core assembly comprises two opposed magnetic circuits spaced along the axis.

5. An electromechanical generator according to claim 1 wherein the magnetic core assembly comprises a pair of magnets spaced along the axis, poles of the magnets having a first common polarity facing towards each other, and poles of the magnets facing away from each other being of a second common polarity and being coupled to a common ferromagnetic body located radially outwardly of the magnets relative to the axis.

6. An electromechanical generator according to claim 5 wherein the common ferromagnetic body is tubular and has radially inwardly extending arms at each end thereof, each arm mounting a respective magnet thereon.

7. An electromechanical generator according to claim 5 wherein the common ferromagnetic body comprises a radially outer and upper and lower portions of the magnetic core assembly and the magnets comprise the radially inner portion.

8. An electromechanical generator according to claim 1 wherein the mount for the coil assembly comprises an annular coil support which has a central mounting portion that extends radially inwardly from a central pail of the coil assembly and is mounted on a central body that is fixed along the axis.

9. An electromechanical generator according to claim 8 wherein the mounting portion defines an annular recess in which is received circuitry for electrically conditioning the electrical output of the coil assembly.

10. An electromechanical generator according to claim 9 wherein the circuitry is encapsulated within the annular recess by a sealing material, which seals and protects the circuitry against undesired environmental influences.

11. An electromechanical generator according to claim 1 wherein the mount for the coil assembly comprises a moulded plastic body that encapsulates the coil, the moulded plastic body including an integral central body that is fixed along the axis and is fitted to a lid and a base of the housing.

12. An electromechanical generator according to claim 11 wherein the integral central body encapsulates an elongate stiffening member extending along the axis.

13. An electromechanical generator according to claim 11 wherein the moulded plastic body encapsulates circuitry for electrically conditioning the electrical output of the coil assembly.

14. An electromechanical generator according to claim 11 wherein the moulded plastic body encapsulates electrical wires extending from the coil assembly and further comprising connecting pins connected to the wires for electrical connection to an external electrical circuit, the connecting pins extending from an external surface of the moulded plastic body that is exposed at an exterior of the housing.

15. An electromechanical generator for converting mechanical vibrational energy into electrical energy, the electromechanical generator comprising a fixed electrically conductive coil assembly and a magnet assembly movably mounted for linear vibrational motion along an axis, wherein the magnet assembly comprises a pair of magnets spaced along the axis, poles of the magnets having a first common polarity facing towards each other and separated by a gap, and poles of the magnets facing away from each other being of a second common polarity and being coupled to a common ferromagnetic body located radially outwardly of the magnets relative to the axis, and a biasing device for biasing the magnet assembly, comprising the pair of magnets and the ferromagnetic body coupled thereto, in opposed directions along the axis towards a central position, wherein the magnet assembly comprises two opposed magnetic circuits spaced along the axis, each magnetic circuit being associated with a respective portion of the coil assembly.

16. An electromechanical generator according to claim 15 further comprising a housing, wherein the electrically conductive coil assembly is fixedly mounted in the housing, the coil assembly having radially inner and outer sides, and upper and lower edges, thereof, a mount for the coil assembly extends inwardly of the radially inner side for fixing the coil assembly in a fixed position in the housing, the magnet assembly being movably mounted in the housing, and the biasing device is mounted between the housing and the magnet assembly, wherein the magnet assembly encloses the electrically conductive coil assembly on the radially outer side and on the upper and lower edges, and on a part of the radially inner side, the magnet assembly having the gap on a radially inner portion thereof through which the mount extends, and the radially inner portion including two opposed magnets spaced along the axis.

17. An electromechanical generator according to claim 15 wherein the biasing device comprises a pair of springs, each being located at a respective end of the magnet assembly.

18. An electromechanical generator according to claim 17 wherein the springs comprise plate springs.

19. An electromechanical generator according to claim 15 wherein the magnet assembly is rotationally symmetric and has a substantially C-shaped cross-section defining the gap.

20. An electromechanical generator according to claim 15 wherein the common ferromagnetic body is tubular and has radially inwardly extending arms at each end thereof, each arm mounting a respective magnet thereon.

21. An electromechanical generator according to claim 15 wherein the common ferromagnetic body comprises radially outer and upper and lower portions of the magnet assembly and the magnets comprise a radially inner portion of the magnet assembly.

22. An electromechanical generator for converting mechanical vibrational energy into electrical energy, the electromechanical generator comprising a fixed electrically conductive coil assembly and a magnet assembly movably mounted for linear vibrational motion along an axis, and a biasing device for biasing the magnet assembly in opposed directions along the axis towards a central position, wherein the magnet assembly is rotationally symmetric and has a substantially C-shaped cross-section enclosing an annular cavity, having a gap on the inner radius thereof in which cavity the coil assembly is disposed.

23. An electromechanical generator according to claim 22 wherein the magnet assembly comprises two opposed magnetic circuits spaced along the axis, each magnetic circuit being associated with a respective portion of the coil assembly.

24. An electromechanical generator according to claim 22 further comprising a housing, wherein the electrically conductive coil assembly is fixedly mounted in the housing, the coil assembly having radially inner and outer sides, and upper and lower edges, thereof, a mount for the coil assembly extends inwardly of the radially inner side for fixing the coil assembly in a fixed position in the housing, the magnet assembly being movably mounted in the housing, and the biasing device is mounted between the housing and the magnet assembly, wherein the magnet assembly encloses the electrically conductive coil assembly on the radially outer side and on the upper and lower edges, and on a part of the radially inner side, the magnet assembly having a gap on a radially inner portion thereof through which the mount extends, and the radially inner portion including two opposed magnets spaced along the axis.

25. An electromechanical generator according to claim 22 wherein the biasing device comprises a pair of springs, each being located at a respective end of the magnet assembly.

* * * * *